United States Patent Office 3,541,447
Patented Nov. 17, 1970

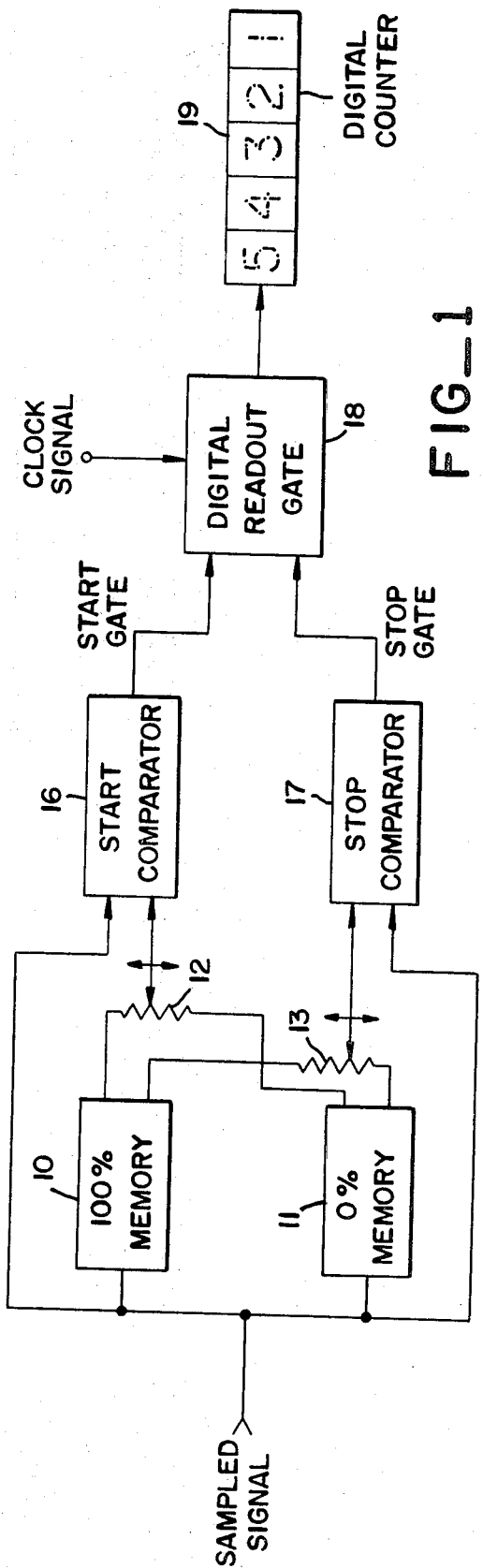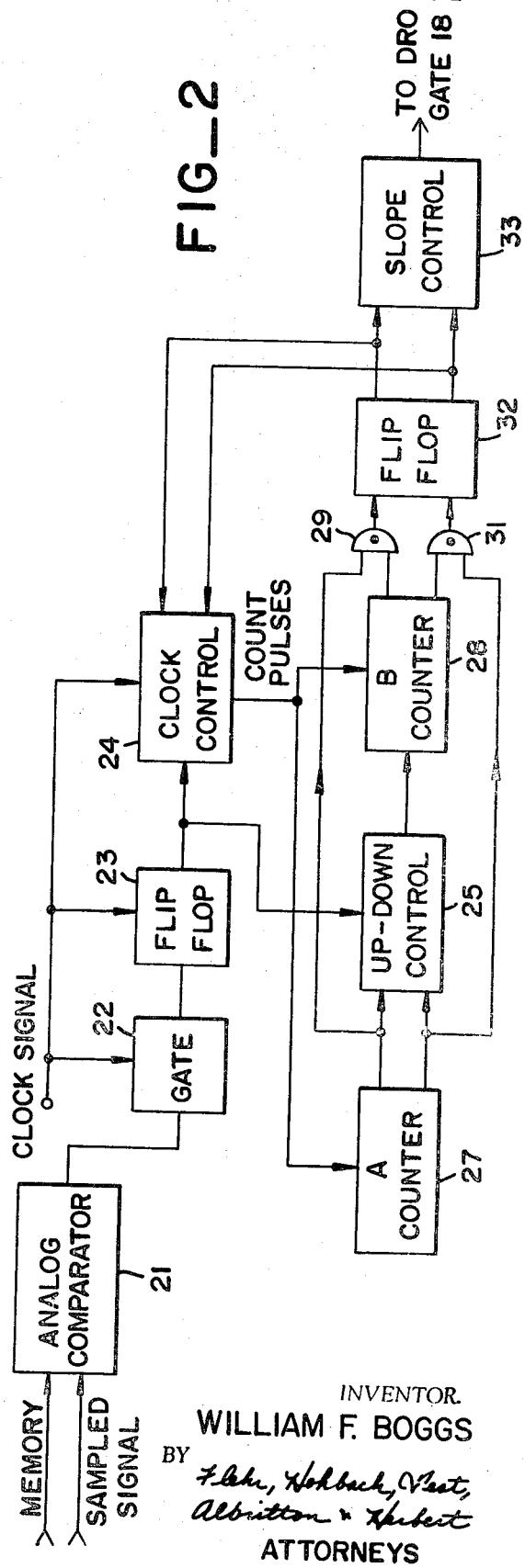

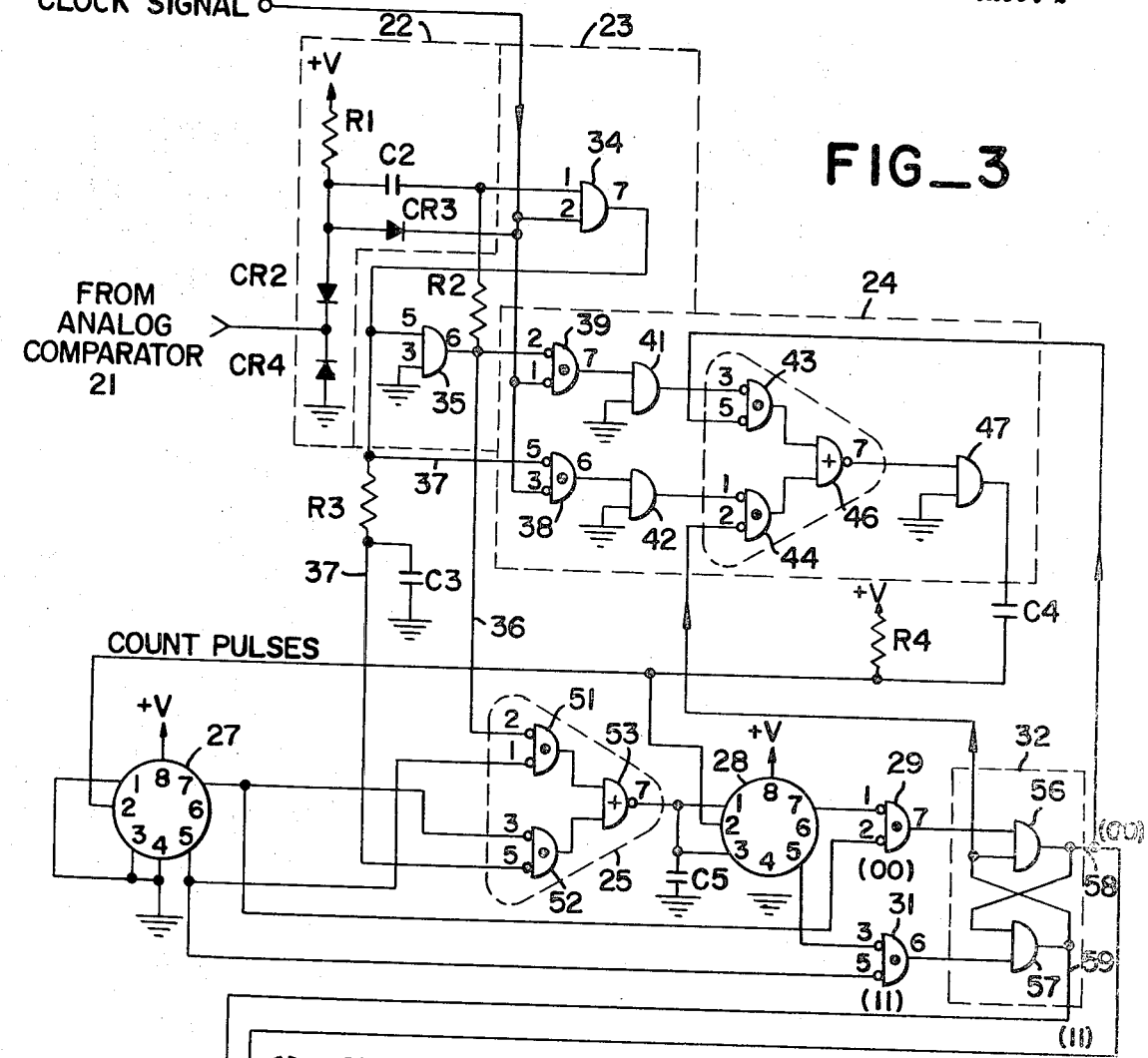
FIG_3
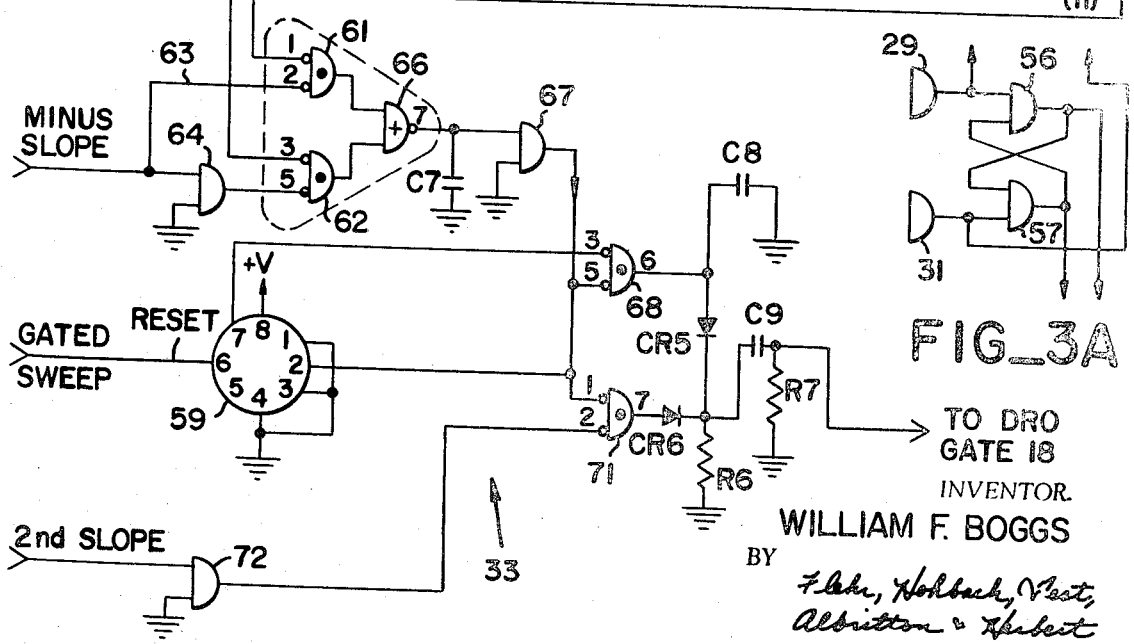
FIG_3A
INVENTOR.
WILLIAM F. BOGGS

3,541,447
COMPARATOR AND DIGITAL DELAY SYSTEM FOR DETERMINING THE TIME INTERVAL BETWEEN TWO SELECTED AMPLITUDE LEVELS OF A TEST WAVEFORM
William F. Boggs, Fremont, Calif., assignor to Automated Measurements Corporation, Los Gatos, Calif., a corporation of California
Filed Dec. 12, 1967, Ser. No. 689,991
Int. Cl. G04f 9/06, 11/08
U.S. Cl. 324—186     4 Claims

ABSTRACT OF THE DISCLOSURE

A comparator and digital delay system determines the time interval between two selected amplitude levels of a test waveform where such waveform is being sampled. A comparator senses when the waveform reaches the predetermined level and feeds this information to a counter; when it receives three true indications the counter produces an output to start a digital readout counter. If a spurious noise pulse is received, the comparator does not produce a count indication and in one embodiment this spurious noise count is actually subtracted from the total of three counts. Thus, an effective noise filter is provided.

BACKGROUND OF THE INVENTION

The present invention is directed, in general, to a comparator and digital delay system and more specifically to a system for determining the time interval between two selected points of a test waveform.

In sampling systems for analyzing test waveforms a "strobe" or clocking signal is used to sample the voltage level of the waveform. In analyzing a waveform, it is desirable to measure characteristics such as rise time which is generally specified as the time interval between the 10% and 90% amplitude points. In order to accomplish the above, the sampling system may include memory devices for storing the 100% and 0% levels of the waveform and by use of voltage divider means the desired 10% and 90% levels are provided. Then, by means of a comparator the actual level of the test waveform can be compared with the reference levels to produce start and stop indications for the digital counter which is incremented by the sampling strobe pulses.

A major source of error and difficulty in making the above measurement is the problem of spurious noise producing a premature compare indication between the reference level and the test waveform.

SUMMARY OF THE INVENTION AND OBJECTS

It is therefore a general object of the invention to provide an improved comparator system which rejects false samples caused by random noise.

It is another object of the invention to provide a comparator system which has a built-in digital delay which requires a predetermined number of true samples before initiating the counting procedure.

In accordance with the above objects there is provided a comparator and digital delay system for a sampling system for sampling a periodic test waveform having a predetermined sampling rate and memory means for storing the level of the test waveform at selected times. The invention includes means for comparing the stored level or percentage thereof with the actual sampled levels of the test waveform and providing a first indication if the sampled level is greater than the stored level and a second indication if the sampled level is less than the stored level. Counting means are provided which are responsive to the first and second indications of the comparing means for counting up or down in accordance with these indications. The counting means have a bottom limit and a top limit with a predetermined number of counts between these limits. The counting means count at the sampling rate in a direction determined by the indication of the comparing means. Clock pulse means provide periodic clock pulses at the sampling rate. A digital readout counter for counting the clock pulses is responsive to the counting means reaching its upper limit for starting or stopping its counting.

BRIEF DESCRIPTION OF THE DRAWINGS

FIG. 1 is a block diagram embodying the present invention;
FIG. 2 is a more detailed block diagram of a portion of FIG. 1;
FIG. 3 is a schematic diagram of a portion of FIG. 2; and
FIG. 3A is a schematic diagram of a portion of FIG. 3 showing an alternative embodiment.

DESCRIPTION OF THE PREFERRED EMBODIMENTS

Referring now to FIG. 1, a sampled test signal waveform is coupled to a 100% memory 10 and 0% memory 11. Each memory stores or remembers the level of the sampled waveform at the time of the 0% and 100% reference points. Divider networks 12 and 13 are coupled to memories 10 and 11 respectively and provide a reference voltage input to start comparator 16 and stop comparator 17 between the 0% and 100% points Thus, for example in the case of the measurement of rise time, start divider 12 would be at the 90% point and stop divider 13 at the 10% point.

Start and stop comparators 16 and 17 are coupled to a digital readout gate 18 which has an input clock pulses which occur at the same frequency as the sampling rate. Gate 18 is coupled to a digital readout counter 19 which in response to an indication by the digital readout gate, is incremented by a start gate pulse from start comparator 16; counting is stopped by a stop gate indication from stop comparator 17. Thus, start and stop comparators 16, 17 control the flow of clock pulses to the digital counter 19 by providing start and stop pulses at the points of the test waveform selected for measurement.

In accordance with the invention, a typical comparator, 16 or 17, is shown in block diagram in FIG. 2. The output from a memory unit and the sampled signal input are both coupled into an analog comparator 21 which provides an output through gate 22 to a flip flop 23 when a compare indication occurs. The output of flip flop 23 is coupled into a clock control device 24 and an up-down control 25. Gate 22, flip flop 23 and clock control 24 are all gated by the clock signal input.

Flip flop 23 has two stable states; one state indicates that the sampled signal is greater than the stored reference memory signal and the other that it is less. An A counter 27 is coupled to up-down control 25 which in turn is coupled to a B counter 28. These two counters also have as inputs count pulses from clock control device 24. Outputs of both A and B counters 27 and 28 are respectively coupled into AND gates 29 and 31 the AND function being indicated by a dot. The outputs of the AND gates are coupled to a flip flop 32. Two outputs of the flip flop for its two different possible stable conditions are coupled both to a slope control device 33 and to clock control 24. The output of slope control 33 is coupled to digital readout gate 18 (FIG. 1).

In operation A and B counters 27 and 28 in conjunction with up-down control 25 are responsive to the state of flip flop 23 and thus the compare output of analog comparator 21 for counting up or down in accordance with the state of the flip flop. Counting means 25, 27, 28 has a top limit in which a coincidence condition occurs at AND gate 31 and sets flip flop 32 to one condition and a lower limit in which AND gate 29 provides an output to set flip flop 32 to its other condition. This indicates to slope control 33 and to DRO gate 18 either to initiate the incrementing of the digital counter or to stop such counting.

The counting means 25, 27, and 28 are, as will be explained in conjunction with FIG. 3 responsive to a predetermined number of counts before reaching either the top or bottom limit. In addition, when a spurious noise pulse on the sampled signal gives an erroneous compare indication it will either be ignored in accordance with one embodiment of the invention or subtracted from the existing count as disclosed in the second embodiment.

Referring now to FIG. 3, the blocks shown in FIG. 2 are illustrated in FIG. 3 in greater schematic circuit detail except for analog comparator 21. The input from analog comparator 21 is coupled to gate 22 which includes diodes CR2 and CR4 which form a common junction into which the analog comparator input is coupled. A clock signal is coupled into the gate through diode CR3. In its quiescent condition, a capacitor C2 coupled between the junction of diodes CR2 and CR3 and a positive voltage source through resistor R1 is charged. When a pulse is produced by analog comparator 21 in response to a compare condition it will pull the input pin 2 of logic unit 34 low through CR3. Logic unit 35 is a part of the flip flop circuit 23 which, in combination with a logic unit 35 provides a bistable output on lines 36 and 37. With pins 1 and 2 of unit 34 low output pin 7 goes high putting a high condition on line 37. A capacitor C3 coupled to ground and to a series resistor R3 in line 37 provides a time delay.

The outputs of flip flop 23 are also coupled to clock control unit 24. More specifically, line 37 is coupled to pin 5 of AND gate 38 and output line 36 is coupled to pin 2 of AND gate 39. The other coincidence inputs on pins 1 and 3 of the AND gate is the clock signal.

The outputs of gates 38, 39 on pins 6 and 7 are coupled to inverters 41 and 42 which have their outputs in turn coupled to pins 1 and 3 of AND gates 43 and 44. The other inputs to these AND gates on pins 2 and 5 extend from flip flop 32. The outputs of AND gates 43 and 44 are coupled into an OR gate 46 through an inverter 47 and a capacitor C4 to A counter 27 and B counter 28. This line is labeled "count pulses." A resistor R4 couples the count pulse line to a +V voltage source.

Counting units 27 and 28 are micrologic units having as inputs pins 1, 2, 3, and 6 and as output pins 5 and 7. With a count pulse input to pin 2 the output on pins 5 and 7 will alternate between high and low states.

In the case of logic circuit 28 with a true input to pins 1 and 3 the output state on pins 5 and 7 will switch with each count pulse. However, with a false input on pins 1 and 3 no change will occur. A capacitor C5 couples pins 1 and 3 to ground to absorb small abnormal spikes termed "splits."

Output pins 5 and 7 of A counter 27 are coupled to pins 1 and 3 of AND gates 51 and 52 respectively. The other inputs to these AND gates are the outputs from flip flop 23. AND gates 51 and 52 have their outputs in turn coupled to an OR gate 53 which has its output on pin 7 coupled to pins 1 and 3 of logic unit 28. Logic units 51 through 53 in combination provide the functions of the up-down control unit 25. Thus, to provide a true output on pin 7, there must be a coincidence input on either AND gate 51 or 52. The outputs of "B" counter 28 are coupled to AND gates 29 and 31. As indicated in parenthesis, AND gate 29 provides an output when the count has reached (00) and AND gate 31 provides an output when the count has reached (11). These outputs are coupled into flip flop 32 which consists of logic units 50 and 57 tied together to provide a typical bistable output on lines 58 and 59. Again the count indication of these lines is indicated in parenthesis when these lines are true. The outputs on lines 58 and 59 are also coupled back into the clock control circuit 24 on pins 2 and 5 of AND gates 44 and 43 respectively. This provides for inhibiting further count pulses from reaching the counters when one of the top or bottom limits (11) or (00) has been reached. The count of the counting means 25, 27 and 28 proceeds from (00) to (01) to (10) and to (11). (11) is the top limit and (00) is the bottom limit.

Output lines 58 and 59 of flip flop 32 are coupled to slope control means 33 which consists of several different logic circuits. In general, the slope control is for the purpose of determining whether a positive or negative slope of the test signal is to be analyzed or whether the time interval is to be measured to a first slope or to a second slope. These inputs are indicated as a "minus slope" and "second slope." A third internal input to slope control 33 is labeled "gated sweep" and serves the purpose of resetting its associated logic unit at the completion of a measurement. This would be handled by the control logic of the overall system.

Referring now to the specific components of slope control 33, the output lines 58 and 59 from flip flop 32 extend to pins 1 and 3 of AND gates 61 and 62. The other inputs to the AND gates are from the minus slope control with a direct connection 63 to pin 2 of AND 61 and an inverted coupling through an inverter 64 to pin 5 of AND gate 62. The outputs of these AND gates are coupled to an inverted coupling through an inverter 64 to pin 5 of AND gate 62. The outputs of these AND gates are coupled to an OR gate 66 through an inverter 67 to a pin 5 of an AND gate 68.

The Gated Sweep or Reset line is coupled to pin 6 of a logic unit 69. When a true appears on pin 6, the output pin 7 is reset to low or false in the presence of an input on pin 2 which extends from the output of inverter 67. The output of logic unit 69 on pin 7 is coupled to pin 3 of AND gate 68. In turn the output of this AND gate, pin 6, is coupled to ground through a capacitor C8 and to an OR gate consisting of diodes CR5 and CR6 which are coupled to ground through a resistor R6. The other terminal of diode CR6 is coupled to the output of an AND gate 71 which has as an input on pin 1 the output of inverter 67 and as an input on pin 2 the second stop indication which is coupled to pin 2 through an inverter 72. The output of the diode OR gate is coupled to digital readout gate 18 through a coupling capacitor C9, which is discharged to ground through resistors R6 and R7.

In operation, when line 58, for example, goes from one state to another, such as from low to high, AND gate 61 no longer will have a coincidence output eliminating any output on OR gate 66. Thus, this gate has a transition from low to high. This is only true however in the case where a minus slope is programmed to be low. Inverter 67 has a transition from high to low and that information is applied to pin 5 of AND gate 68 and pin 1 of AND gate 71. These two AND gates, 68 and 71 are used to gate the information with the second slope input which when the second slope is in a true condition will require at least two negative transitions to be coupled in from inverter 67. If the second slope signal is programmed to be high the output of inverter 72 is low so that the first transition that comes to AND gate 71 will give a positive transition on its output and this will be coupled through diode CR6 and digital readout gate 18.

If, on the other hand, the second slope input is programmed to be low or true the output of inverter 72 will be high and there will be no output on pin 7 of AND gate 71. Logic unit 69 serves as a flip flop and will change states to place a high on its output pin 7 and on the input pin 3 of AND gate 68. Thus, the output of this AND gate 68 will not change either. The capacitor C8 on the output of AND gate 68 absorbs any spurious output pulse caused by overlapping during a change of states of the input lines. However, the second time a negative transition occurs on the output of inverter 67 this also produces an input to pin 2 of flip flop 69 to switch pin 7 low. This places a low on pin 5 of AND gate 68 and since pin 3 is low a positive transition on the output of pin 6 and AND gate 68 will occur which will be diode coupled through CR5 to produce an output. This output will have occurred on the second slope.

The slope circuit 33 is sensitive only to a transition on the output lines of flip flop 32 from (00) to (11). When flip flop 32 goes to (00) there is no output because of the following. The output of OR gate 66 will go low making the output of AND gate 15 go high. The output of either pin 6 on AND gate 68 or pin 7 on AND gate 71, which ever one was active, will go low. This low output will be coupled to DRO gate 18 but since this low output must be coupled through the diode CR5 or CR6 and since the resistor R6 can only discharge the capacitor at a relatively low rate, there will only be a small pulse in the negative direction which will not affect the logic of the digital readout gate 18.

As was discussed previously, the output from flip flop 32 on lines 58 and 59 is coupled to AND gates 43 and 44 of clock circuit 24 to lock out or inhibit any further count pulses to prevent counting below (00) or above (11). However, since the flip flop output is either in one or the other of its stable states, any count down indication by flip flop 23 will be locked out if line 58 is indicating a (00) count. Thus, if two proper compare indications were received and then a third noise indication the counter would remain at its two count level. This mode of operation is satisfactory for many applications.

The embodiment of FIG. 3A modifies the inhibit or lockout inputs to AND gates 43 and 44 and these are coupled instead to the outputs of AND gates 29 and 31. With this type of lockout connection it is obvious that since the AND gates do not have an output until a (00) or (11) condition is reached that spurious noise pulses will be subtracted from the count. In some applications this may be a valuable feature.

In actual operation, the sampling system would provide to the comparator and delay system of the present invention several samples prior to the actual measurement. However, the logic circuitry would blank out any positive readout indications until the measurement was to be actually taken. Since these several samples occur at approximately the same position on the waveform as the final actual test this will normally set the up-down counting means to the proper (00) count level.

Thus, the present invention has provided an improved comparator and digital delay system which with a delay of three counts effectively filters out noise. However, in the present invention any convenient number of delay counts can be used. The present invention is particularly advantageous where varying sampling rates are used since the circuit of the present invention is insensitive to changes in sampling frequency.

What is claimed is:

1. A comparator and digital delay system for a sampling system for sampling magnitude levels of a periodic test waveform said system having a predetermined sampling rate and having memory means for storing the level of said test waveform at selected times, said system comprising means for comparing a percentage of said stored level with the sampled levels of said waveform and providing a first indication if said sampled level is greater than said stored level and a second indication if said sampled level is less than said stored level, up and down counting means responsive to said first and second indications of said comparing means for counting up in accordance with said first indication and counting down in accordance with said second indication, said counting means having a bottom limit and a top limit with a predetermined number of counts between said limits to provide a digital delay, a clock pulse means for producing periodic clock pulses at said sampling rate, a digital readout for counting said clock pulses and responsive to said counting means reaching said upper limit for starting or stopping such counting.

2. A comparator and digital delay system as in claim 1 in which said predetermined number of counts is three.

3. A comparator and digital delay system as in claim 1 together with bistable means coupled to said comparing means for providing said first and second indications.

4. A comparator and digital delay system as in claim 1 in which said counting means has a bottom limit of (00) and counts up in accordance with a binary number system to a top limit of (11).

References Cited

UNITED STATES PATENTS 3,423,677    1/1969    Alford et al.

ALFRED E. SMITH, Primary Examiner

U.S. Cl. X.R.

324—188